United States Patent [19]
Anthony

[11] Patent Number: 5,110,171
[45] Date of Patent: May 5, 1992

[54] PROTECTIVE LINER FOR CARGO AREA OF VEHICLE

[76] Inventor: Colleen P. Anthony, 2606 East Bay Dr. N.W., Gig Harbor, Wash. 98335

[21] Appl. No.: 529,557

[22] Filed: May 29, 1990

[51] Int. Cl.⁵ .............................................. B60R 13/01
[52] U.S. Cl. ............................................... 296/39.2
[58] Field of Search ........................... 296/39.1, 39.2; 224/42.42; 105/423; 229/190, 122

[56] References Cited

U.S. PATENT DOCUMENTS

| | | | |
|---|---|---|---|
| D. 298,112 | 10/1988 | Hall . | |
| D. 298,817 | 12/1988 | Hamilton . | |
| 2,710,134 | 6/1955 | Schroeder | 105/423 |
| 3,469,762 | 9/1969 | Torre | 229/122 |
| 3,653,710 | 4/1972 | Barnard | 296/39.1 |
| 3,944,129 | 3/1976 | McCall et al. | 229/190 X |
| 4,181,349 | 1/1980 | Nix et al. . | |
| 4,765,671 | 8/1988 | Allen . | |
| 4,789,574 | 12/1988 | Selvey . | |
| 4,890,874 | 1/1990 | Davis | 296/39.2 |
| 4,960,301 | 10/1990 | Frye et al. | 296/39.2 |

FOREIGN PATENT DOCUMENTS 1037955  8/1958  Fed. Rep. of Germany ...... 229/190

OTHER PUBLICATIONS

J. C. Whitney & Co., "Cargo Area Protectors" p. 61 vol. 506J, May 1989.
"Polyguard VanLiner"© 1989 Polyguard NW MFG, Tacoma, WA Instruction Manual.
1986 Ford Bronco® Light Truck Accessory Book, p. 84.
"Polyguard VanLiner"© 1989 Polyguard NW Mfg. Tacoma, WA (Version II).
1990 J. C. Whitney Co., Automotive Catalog, p. 59.

Primary Examiner—Margaret A. Focarino
Assistant Examiner—Gary C. Hoge
Attorney, Agent, or Firm—John M. Neary

[57] ABSTRACT

An economical, disposable protective liner for the cargo bed area of vehicles, and especially designed for utility vehicles such as four wheel drive passenger vehicles and for station wagons, enclosed vans and the like, is made from flexible, semi-rigid, recyclable materials that can be quickly assembled and slid into place within a vehicle by one person. The liner is provided with interlocking connective corners which make the assembled liner self-supporting so it remains erect and prevents cargo spillage during use. The liner is not fastened to the vehicle but instead slides freely in and out of the cargo area between the wheel wells of the vehicle.

19 Claims, 8 Drawing Sheets

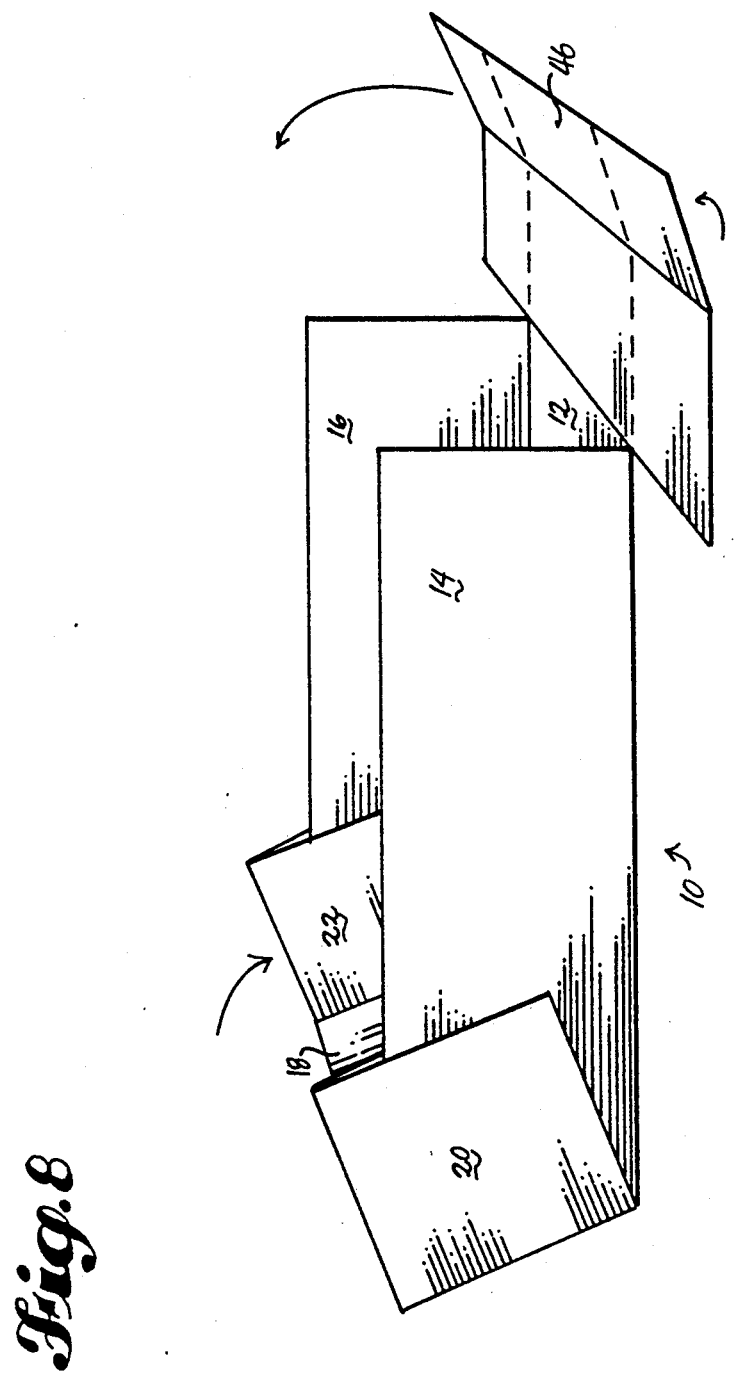

PROTECTIVE LINER FOR CARGO AREA OF VEHICLE

BACKGROUND OF THE INVENTION

This invention pertains to an economical, disposable protective liner for the cargo bed area of an automotive vehicle and is particularly designed for use in enclosed utility vehicles such as four wheel drive passenger vehicles and other vehicles having large cargo areas where occasional protection from damage by transported objects is desired.

Vehicles which are designed to be comfortable passenger vehicles that convert into useful hauling vehicles are common. Some have a rear seat which folds partially or totally into the rear bed or which can be removed totally to provide a larger hauling area than is available in more conventional vehicles whose storage areas are not designed for such use. Such vehicles, some of which are presently marketed under trademarks such as "BLAZER", "BRONCO", "CHEROKEE", "JEEP", and other vehicles such as large station wagons, passenger vans, etc. are often nicely upholstered in fabrics that would show wear and dirt quickly if subjected to even occasional cargo transportation. Particularly, owners of such vehicles may need to transport large pets, firewood, gardening supplies, small motors or engines, bicycles, sports equipment and other common items occasionally. Transportation of such items without suitable protection of the interior of the vehicle would result in increased wear and/or soiling, and hence the value of the vehicle would be reduced.

Many types of liners have been specifically designed for pickup truck beds. Most of these are made of durable, rigid materials such as wood, rubber or plastic because of the excessively hard use and exposure to adverse weather conditions that a pickup truck bed is often subjected to. Often these liners are precast and they are usually fastened directly to the truck bed with bolts, snaps, etc., making removal and storage difficult. Truck bed liners are not designed for interior vehicle use and are certainly not designed to be either disposable or recyclable. They are usually expensive and would generally be purchased by a vehicle owner with the intent to leave the liner fastened into the cargo area for as long as the owner owns the vehicle.

Presently there are several types of cargo bed liners designed for use in interior cargo areas of automotive vehicles. U.S. Pat. Nos. 4,789,574 and 4,765,671 are examples of such liners. However, these liners and other liners of the prior art are made of vinyl, plastic or fabrics and are intended to be fastened into place during use. These liners are relatively expensive to purchase, heavy and bulky to store, complicated and time consuming to assemble and are not intended to be disposable or recyclable. As a consequence, owners of utility vehicles will often carry cargo unprotected and damage their vehicles or pay extra to have cargo delivered.

Thus, there is a need for a protective liner for a cargo bed area that is light weight, can be easily assembled by a single person, and is economical enough that it can be purchased at garden centers, hardware stores, lumber yards, automotive supply houses, and similar places where the vehicle owner may have an immediate single need to protect the interior cargo area of the vehicle. Such a liner must also be manufactured at a low cost, must be easily inserted into place, easily removed and collapsed after use, and conveniently stored or ecologically disposed of. It must also fit a variety of sizes of cargo bed areas, most of which will have wheel wells protruding into the sides of the area. Finally, it should prevent leakage of loose materials into other areas of the vehicle.

OBJECTS OF THE INVENTION

Accordingly, it is an object of the present invention to provide a lightweight protective liner for use in the cargo area of various sizes of enclosed multi-use or utility vehicles.

It is another object of the present invention to provide a protective liner which is easily assembled and disassembled by one person.

It is a further object of the present invention to provide a protective liner in which the end and sides are joined at the connecting corners to prevent cargo spillage or leakage.

It is yet another object of the present invention to provide a protective liner which, after assembly, remains erect without the use of glue, tapes or other fasteners.

It is yet a further object of the present invention to provide a protective liner which is not fastened directly to the interior of the vehicle, and remains slidably loose between the wheel wells for easy insertion and removal.

It is a still a further object of the present invention to provide a protective liner made of a lightweight, ecologically recyclable material that is easily manufactured at a low cost to the consumer so that it is economical enough for a single use, but is durable enough for several or multiple uses.

BRIEF DESCRIPTION OF THE INVENTION

These and other objects of the invention are attained in a liner which is composed of a flexible, semi-rigid recyclable material such as corrugated paperboard or matted wood fiber materials or the like and is folded from a single flat sheet or blank to form a three sided topless box structure. The blank has prestamped fold lines and precut slits to assist in erection. When erected, the liner has a bottom panel, two side panels and at least one end panel. Corner flap portions are raised to an upright position and engage the side panels when the end panel is raised to an upright position. Once engaged by the corner flaps, the side panels are held in an upright position without fasteners or other reinforcement. The corner flaps and the end panel are of double thickness and serve to reinforce the entire structure.

BRIEF DESCRIPTION OF THE DRAWINGS

FIG. 8 is a perspective view of an alternative embodiment of the present invention, partially assembled.

DETAILED DESCRIPTION OF THE INVENTION

Figure 1:
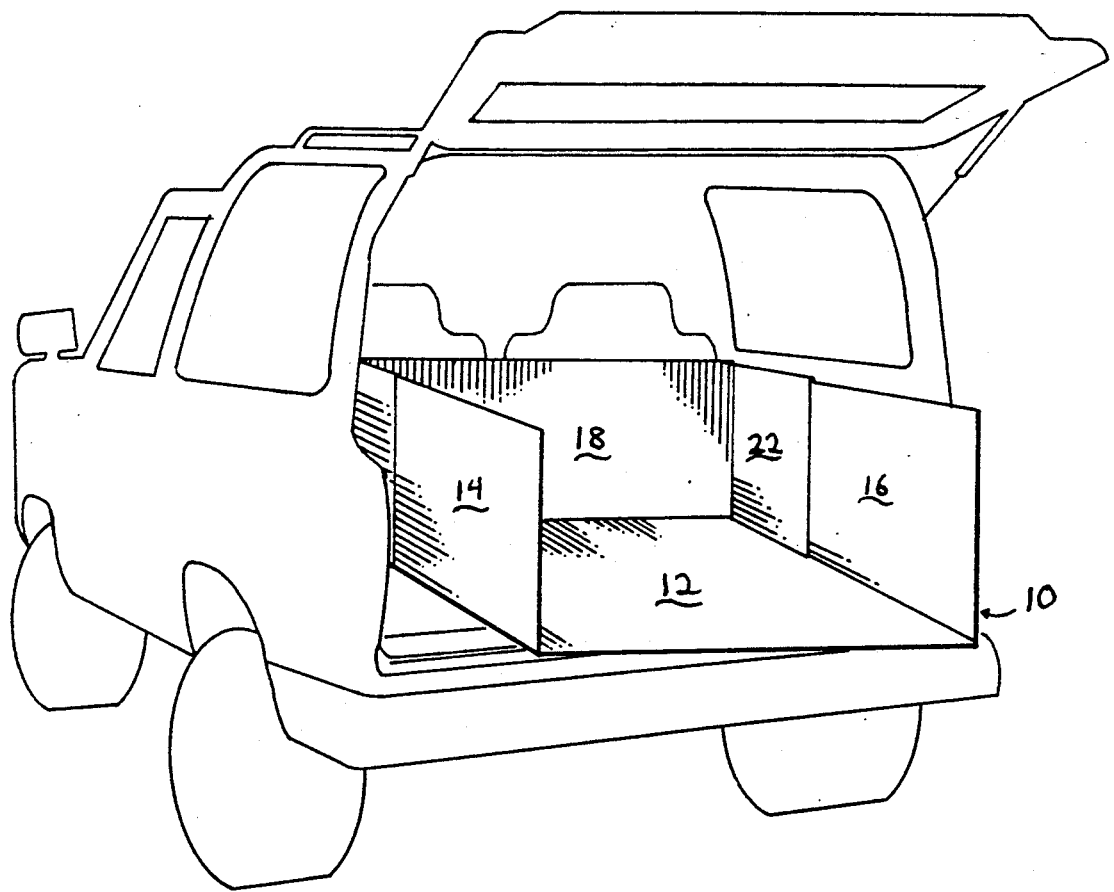
FIG. 1 is a perspective view of the preferred embodiment of the invention partially inserted in place between the wheel wells within the enclosed rear cargo area of a vehicle.

Referring now to FIG. 1, a lightweight, disposable protective liner 10 made of a flexible, semi-rigid, recyclable material such as corrugated paperboard is shown assembled and partially inserted into the cargo area where it fits between the wheel wells of an enclosed vehicle. As used herein, the liner 10 is "assembled" when it is folded from its blank form shown in FIG. 3 to its erected form shown in FIG. 2. The entire liner 10 is made of one piece of material, so "assemble" as used herein does not necessarily imply the fastening of multiple pieces into a single assembly, but encompasses the mere folding of a single piece of material in a certain manner to create an erected, self-supporting protective cargo bed liner, as described further herein. If the vehicle were of the type where the tailgate is lowered instead of raised, the assembled liner could be placed in a partially inserted position, as shown in FIG. 1, to protect the tailgate area of the vehicle. The liner 10 can also be only partially inserted to protect the cargo area while a rear passenger seat remains in an upright position. The liner 10 can be fully inserted when there is sufficient interior space, such as when a rear passenger seat is lowered to create additional cargo area. Additionally, as described in more detail below, two liners can be assembled and nested together in such a manner as to form a four sided container that is extendable to various lengths, and is especially adaptable for use in enclosed vans. The liner 10 is assembled outside of the vehicle, then easily lifted onto the rear tailgate or rear bumper and slid into place between the wheel wells of the vehicle.

The liner 10, as assembled, has a bottom panel 12, two side panels 14, 16 and at least one end panel 18. As described further below, the liner 10 is assembled in such a manner that the end panel 18 is a doubled thickness of corrugated paperboard or other flexible, semi-rigid recyclable material such as cellulosic pulp matting. Additionally, when assembled, double thickness corner flaps 20, 22 (only one of which is shown) are formed between the end panel 18 and the two side panels 14, 16 defining downwardly opening pockets between the double layers of material. These pockets of the corner flaps 20,22 engage with and interlock the end panel 18 with the side panels 14, 16 so that, after assembly, the rear portions of the side panels 14, 16 become enclosed in the pockets between the double thickness of the corner flaps 20, 22 and an area of triple thickness is formed along slightly less than one half of the length of each of the side panels 14, 16. This interlocking creates corners which provide secure protection from spillage or leakage. Since the material used for the liner 10 is flexible, the side panels 14, 16 and end panel 18 can bow out slightly to accommodate odd sized items or loose items without contamination to the rest of the vehicle; since the material is semi-rigid the liner 10 is self-supporting. The end panel 18 of the liner 10 tends to be supported either by the back of the erect forward passenger seats or by back of an erect rear passenger seat. By resting the end panel 18 against the back of a passenger seat, the end panel 18 is prevented from bowing too far backward and pulling the corner flaps 20, 22 free from the side panels 14, 16. The area of the side panels 14, 16 where the corrugated paperboard or other material is a single thickness is the area closest to the rear of the vehicle, and that area tends to be at least partially supported by the interior sides of the vehicle's wheel wells which usually protrude up into the cargo area. The assembled liner 10 slides between the wheel wells into position within the vehicle.

Figure 2:
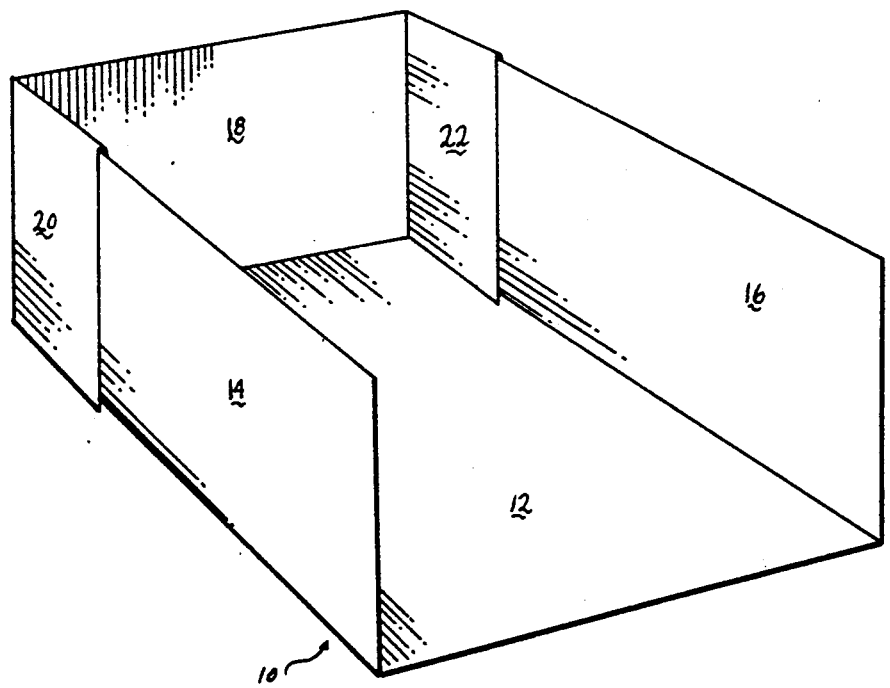
FIG. 2 is a perspective view of the preferred embodiment of the invention as assembled.

FIG. 2 shows a freestanding assembled liner 10, as it would appear after assembly but before insertion into a vehicle. The end panel 18 has been folded double. Corner flap portions 20, 22 of end panel 18 are then folded upright relative to end panel 18. End panel 18 is next raised into an upright position relative to the bottom panel 12 and the corner flaps 20, 22 are simultaneously brought to rest over either side of the rearward area of each side panel 14, 16. This creates interlocked, leakproof corners between the end panel 18 and the side panels 14, 16. Additionally, folding of the corner flap portions 20, 22 over the side panels 14, 16 forms an area which is composed of triple thickness of flexible semirigid material on the rearward area of the side panels 14, 16. The entire assembly is free of screws, hooks, tape, rivets, snaps or other fasteners and is entirely self-supporting. Additionally, the assembled liner 10 does not fasten to the interior of the vehicle, although tape or Velcro type fasteners could easily be used if desired. The liner 10 is of a convenient size so that an adult person can readily grasp both side panels 14, 16 or a side panel and the bottom panel 12 to lift the assembled liner 10 into place within the vehicle or to remove it after use.

Figure 3:
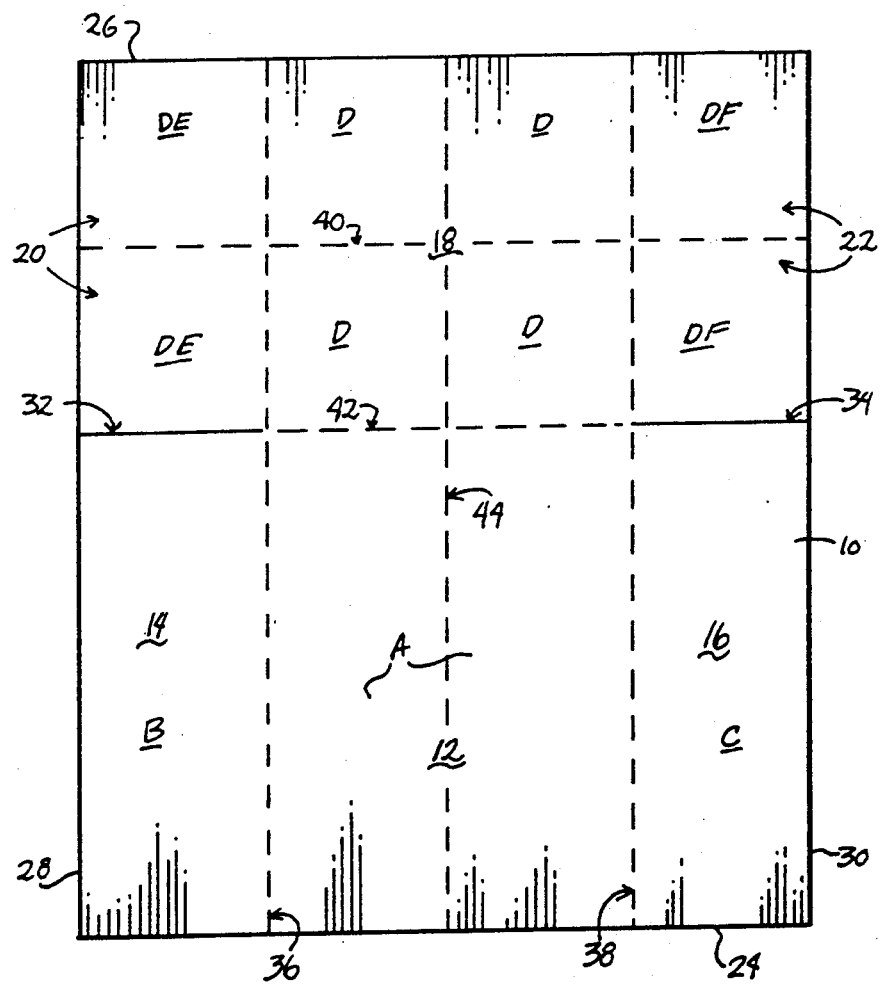
FIG. 3 is a plan view of the present invention in unassembled form.

Turning now to FIG. 3, a liner 10 is shown in a completely unassembled form. The single blank of material such as corrugate that forms the liner 10 appears as it is laid out in preparation for assembly. The blank is comprised of a forward and a rearward edge, 24 and 26 respectively, two side edges 28, 30, two cut or perforated slits 32, 34 extending inwardly perpendicular from the side edges 28, 30 and a multitude of fold lines preformed in the blank. Two fold lines 36, 38 parallel with and nearest to the side edges 28, 30 define the fold between the side panels 14, 16 and the bottom panel 12. The fold line 40 parallel with and nearest to the rearward edge 26 defines the center of the end flap panel 18. The fold line 42 parallel and nearest to the forward edge 24 defines the fold between the end flap panel 18 and the bottom panel 12. The cut slits 32, 34 define the separation between the corner flap portions 20, 22 of the end panel 18 and the side panels 14, 16. Finally, an optional fold line 44 runs parallel to both side edges 28, 30 and down the center of the blank 10 for more compact folding in packaging for sale or during storage of the liner 10 when not in use.

The fold lines serve to define the outer boundaries of six rectangular areas within the blank. The first area A comprises the bottom panel 18 and is defined by the fold lines 36, 38 parallel and nearest to the side edges 28, 30 and the fold line 42 parallel and nearest to the forward edge 24. The second and third rectangular areas B, C comprise the side panels 14, 16 and are defined by the fold lines 36, 38 parallel and nearest to the side edges, the perpendicular cut or perforated slits 32, 34 and the respective side edges 28, 30. The fourth area D comprises the end panel 18 and is defined by the rearward edge 26 and by the fold line 42 nearest the forward edge, which fold line ends at the cut slits 32, 34, and further defined by the cut slits 32, 34. Within the end panel 18 defined by the fourth area D, corner flap portions DE, DF are defined in the fifth and sixth areas by the respective side edges 28, 30, the rear edge 26 and the respective fold lines 36, 38 nearest to and parallel with the side edges 28, 30.

Figure 4:
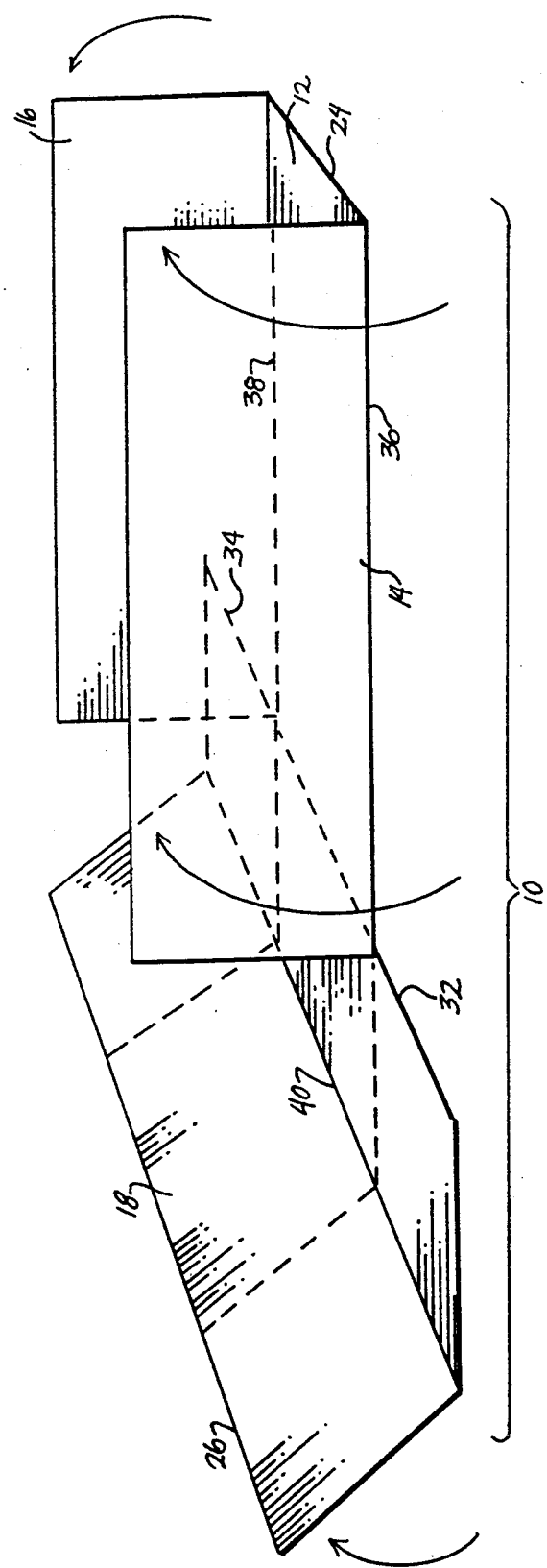
FIG. 4 is a perspective view of the present invention after the initial assembly steps.

FIG. 4 shows a liner 10 in a partially assembled position. The end panel 18 is folded along the fold line 40 nearest to and parallel with the rearward edge 26. The end panel 18 is folded upwardly and inwardly toward the center of the blank. Next, the side panels 14, 16 are raised to a vertical position relative to the bottom panel 12 of the blank 10. The side panels 14, 16 are separated from the end panel 18 by the cut slits 32, 34. For clarity, some fold lines have been eliminated from the drawing.

Figure 5:
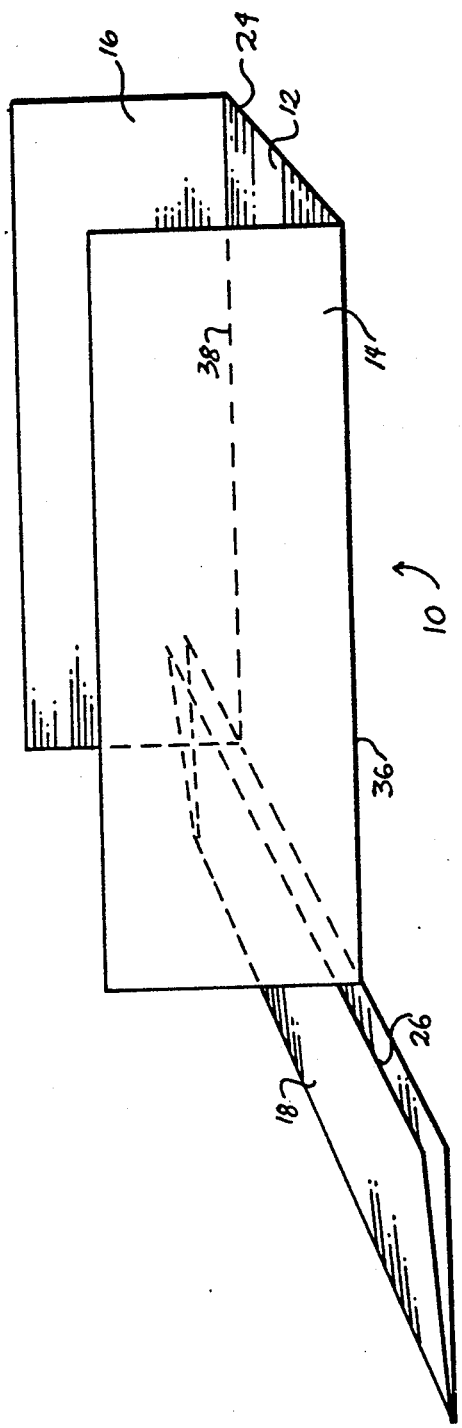
FIG. 5 is a further perspective view of the present invention partially assembled.

FIG. 5 shows the liner 10 more completely assembled than FIG. 4. The end panel 18 has been completely folded inwardly toward the center of the blank 10 and is now composed of two layers of material. The side panels 14, 16 remain in a vertical position relative to the bottom panel 12.

Figure 6:
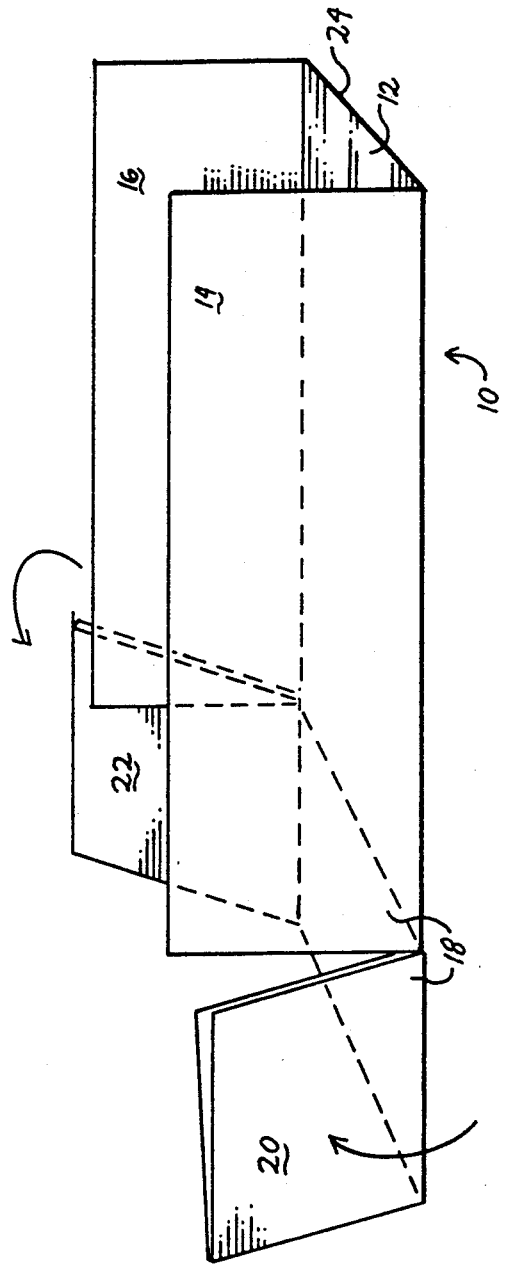
FIG. 6 is a further perspective view of the present invention more partially assembled.

FIG. 6 shows the liner 10 in a more completely assembled position than FIG. 5. The corner flap portions 20, 22 of the end panel 18 are folded upwardly until they are in a vertical position relative to the bottom panel 12 and are parallel in space to the raised side panels 14, 16. At this point, because the end panel 18 was doubled in thickness during the initial folding, as shown in FIG. 5, the corner flap portions 20, 22 are also of double thickness, and are ready to descend over either side of the rearward portion of each side panel 14, 16, creating corners of triple thickness. Once folded towards the forward edge 24 of the blank 10, the corner flap portions 20, 22 envelope each of the side panels 14, 16 and interlock with the side panels 14, 16, forming secure leakproof corners between the side panels 14, 16 and the end panel 18.

Figure 7:
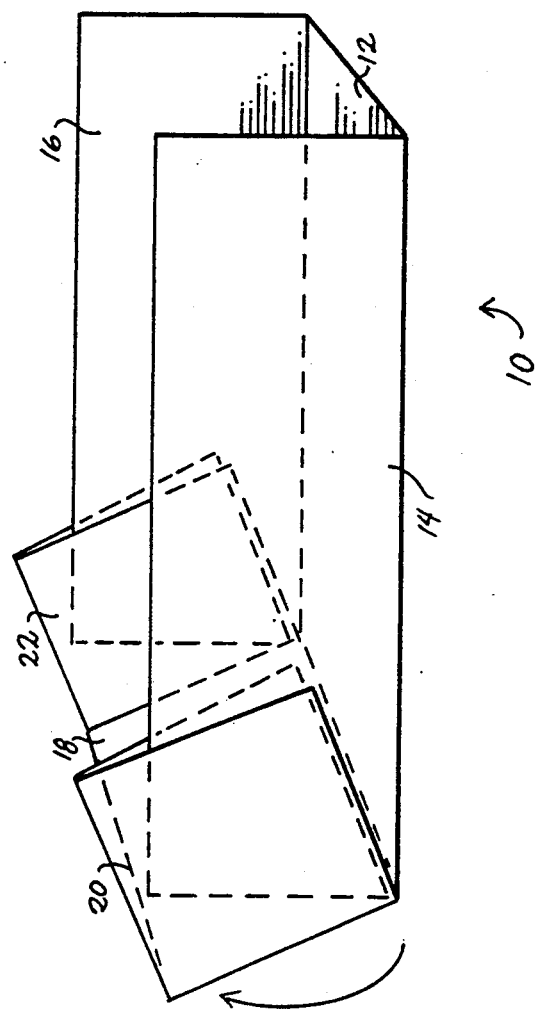
FIG. 7 is a further perspective view of the present invention almost completely assembled.

FIG. 7 shows the liner 10 in an almost totally assembled position. The corner flap portions 20, 22 have been lowered over the side panels 14, 16. The edges of the corner flaps 20, 22 which are inside the liner 10 will descend down to rest on the bottom panel 12 of the liner 10. The exterior edges of the corner flaps 20, 22 will either rest on the cargo area or move freely as the side panels 14, 16 and end panel 18 are flexed by cargo or handling.

Upon removal of the assembled liner 10 after use, the corner flaps 20, 22 and the end panel 18 are disengaged from the side panels 14, 16 by pushing the end panel 18 rearward, away from the bottom panel 12. The corner flaps 20, 22 will lift up off of and separate from the side panels 14, 16. The end panel 18 is then laid flat relative to the bottom panel 12 and the corner flap portions 20, 22 are also flattened. The end panel 18 is then further unfolded along its central fold line 40. At this point, the liner blank 10 is as shown in FIG. 3. To fold the blank for storage or for sale, the side panels 14, 16 and corner flap portions 20, 22 are folded inwardly towards a central fold line 44 which runs through the center of the liner blank 10 parallel to the side edges 28, 30. The end panel 18 is then lifted upward and folded forwardly onto the layers created by the side panels 14, 16 and the bottom panel 12. The entire assembly is then folded along the central fold line 44 and either packaged, tied, clipped or otherwise retained in a folded position for sale or for storage.

It is easy to see that a second end panel 46 can be added to the liner blank 10 to form a four cornered liner 10 as shown in FIG. 8. Although it is not shown, it would also be easy to see that rivets or snaps or other fasteners can be added to the corner portions 20, 22 to secure the end panel 18 to the side panels 14, 16 and prevent disassembly when removing the liner 10, for instance, while it contains some sort of load that might tend to push the end panel 18 back and away from the bottom 12 and side panels 14, 16.

Obviously, numerous modifications and variations of the preferred embodiment are possible and will occur to those ordinarily skilled in the art in view of this disclosure.

Accordingly, it is expressly intended that those modifications and variations, and the equivalents thereof, are considered to fall within the spirit and scope of the following claims, wherein I claim:

1. A unitary protective liner for the cargo area of vehicles comprising: a rectangular blank of flexible, semi-rigid material, having forward and rearward first parallel edges and two second parallel side edges orthogonal to said first parallel edges, multiple fold lines substantially parallel to said first parallel edges and multiple fold lines substantially parallel to said second parallel edges, a single pair of cut slits of equal length extending inwardly from said second parallel edges, said pair of cut slits are located opposite each other and extend inwardly from said first parallel edges to a point defined by said fold lines, said pair of cut slits are the only cuts in said blank, and said blank, when assembled by folding into a protective liner for insertion into a vehicle between the wheel wells thereof, has two side panels supported by said wheel wells and a single end panel interlocked with said side panel, said protective liner having an open end opposite side end panel to facilitate loading and unloading of cargo into and out of said protective liner.

2. A protective liner as described in claim 1 in which said blank forms first through sixth rectangular areas which, when folded, define the structure of a protective liner for a cargo area of a vehicle, said first area defining a bottom panel, said second area defining a first side panel, said third area defining a second side panel, said fourth area defining an end panel, said fifth area defining a first corner flap portion, and said sixth area defining a second corner flap portion, said fifth and sixth areas being joined to said fourth area.

3. A protective liner as described in claim 2 wherein said fifth and sixth areas of said blank are further defined within said fourth area by slits cut between said fifth and sixth areas and said second and third areas.

4. A protective liner as described in claim 2 wherein said fourth, fifth and sixth areas are equally intersected by at least one of said fold lines and points of junction between said fourth and fifth and between the fourth and sixth areas are defined by at least one of said fold lines.

5. A protective liner as described in claim 4 wherein the interior ends of said cut slits are further joined by one of said fold lines.

6. A liner as defined in claim 1, wherein said semi-rigid material is corrugated paperboard, and said paperboard terminates at said open end in a free edge.

7. A liner as defined in claim 6, wherein said rectangular blank is free of folds and slits parallel to said forward edge from said forward edge all the way back to said one pair of slits.

8. A protective liner for a cargo area of vehicles, said liner having a bottom panel, a first side panel, a second side panel and at least one end panel, said liner being formed from a single piece of flexible, semi-rigid material having a plurality of fold lines and cut slits such that said first and second side panels and said end panel are formed by folding said flexible material into an upright position relative to said bottom panel, and corner flap portions are formed by folding end portions of said end panel inwardly and engaging said side panels so that said liner is free standing and slidable within said cargo area and said side panels and said end panel of said liner are joined by said corner flap portions and engaged in an upright position, wherein said liner has only one end panel and one open end for ease of loading and unloading cargo.

9. A protective liner as described in claim 8, wherein said single piece of material, before being assembled by folding to form said liner, is rectangular.

10. A protective liner as defined in claim 8, wherein said liner is sized to slide between the wheel wells of an enclosed cargo area of said vehicle such that said first and second side panels are supported laterally by said wheel wells.

11. A protective liner as defined in claim 10, wherein said first and second side panels are continuous panels, free of cuts or openings.

12. A protective liner as defined in claim 8, wherein said single piece of material has only two slits, one each extending perpendicularly in from opposite sides to the nearest fold line, to enable said end panel and two side panels to be folded upright, said end panel having a lateral fold line that enables said end panel to be folded double to create a pocket that can be folded down over said side panels to make said liner self-supporting.

13. A liner as defined in claim 8, wherein said end panel is a doubled thickness of paperboard with a folded edge at the top thereof in said upright position, and free edge lying adjacent said bottom panel.

14. A liner as defined in claim 8, wherein said end portions of said end panel are sized so that all portions of said end portions terminate above or flush with said bottom panel when said cargo liner is folded into its erected position.

15. A liner as defined in claim 8, wherein said semi-rigid material is corrugated paperboard.

16. A liner as defined in claim 8, wherein said liner is free of folds parallel to an edge at said open end and slits from said open end, up to said end panel.

17. A liner as defined in claim 8, wherein said corner flap portions interlock with said side panels in the upright erected position of said liner to support said side panels without the use of adhesives or fasteners, so that said corner flap portions releasably support said side panels.

18. The assembly method of a cargo bed liner which comprises the steps of:
folding a back panel portion along a central fold line;
folding a first side panel portion;
folding a second side panel portion;
folding a first corner flap portion;
folding a second corner flap portion;
folding said back panel portion into an upright position wherein the connected corner flap portions engage the side panel portions, wherein one end of said cargo bed liner, opposite said back panel, is left open to facilitate loading and removal of cargo through said open end.

19. A method of assembly of a cargo bed liner from a flat, rectangular blank or flexible, semi-rigid material having a longitudinal center line, comprising the steps of:
folding an end panel upwardly along a first fold line which is located approximately midway along the length of said end panel and is parallel to an outer edge of said end panel, wherein said end panel after folding is doubled in thickness and said outer edge of said end panel rests along a second fold line defining the junction of said end panel and a rearmost edge of a bottom panel and which second fold line includes a first and second cut slit at both ends of said second fold line,
folding a first side panel into a substantially upright position along a third fold line, which third fold line intersects the interior end of a first cut slit and which third fold line extends beyond said first cut slit through said end panel to said outer edge of said end panel, further folding said first side panel into a substantially upright position wherein said first side panel after folding is at a right angle to said bottom panel and ends at said point of intersection with said first cut slit,
folding a second side panel into a substantially upright position along a defined fourth fold line, which fourth fold line intersects the interior end of a second cut slit and which fourth fold line extends beyond said second cut slit through said end panel to said outer edge of said end panel, further folding said second side panel into a substantially upright position wherein said second side panel after folding is at a right angle to said bottom panel and ends at said point of intersection with said second cut slit,
folding a first doubled corner flap portion defined within said end panel by said first cut slit and said third fold line along said third fold line into a substantially upright position wherein said first corner flap portion is perpendicular to said end panel and said bottom panel and is parallel and adjacent to said folded first side panel,
folding a second doubled corner flap portion defined within said end panel by said second cut slit and said fourth fold line along said fourth fold line into a substantially upright position wherein said second corner flap portion is perpendicular to said end panel and said bottom panel and is parallel and adjacent to said folded second side panel,
folding said doubled end panel upright along said second line upwardly and inwardly toward said bottom panel and simultaneously folding said first and second doubled corner flap portions over said first and second side panels so that a first single thickness of each of said doubled thickness of each of the said first and second corner flap portions rests on one side of said first and second side panels and a second single thickness of said doubled thickness of each of said first and second corner flap portions rests on another side of said first and second side panels further forming locking and reinforced corners and retaining said first and second side panels and said end panel is an upright position relative to said bottom panel wherein one end of said cargo bed liner, opposite side end panel, is left open to facilitate loading and removal of cargo through said open end.

* * * * *